US007570760B1

(12) United States Patent
Olson et al.

(10) Patent No.: US 7,570,760 B1
(45) Date of Patent: Aug. 4, 2009

(54) APPARATUS AND METHOD FOR IMPLEMENTING A BLOCK CIPHER ALGORITHM

(75) Inventors: Christopher H. Olson, Austin, TX (US); Gregory F. Grohoski, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 919 days.

(21) Appl. No.: 10/939,829

(22) Filed: Sep. 13, 2004

(51) Int. Cl.
*H04K 1/00* (2006.01)
(52) U.S. Cl. .......................................... 380/37; 380/28
(58) Field of Classification Search ........................ None
See application file for complete search history.

(56) References Cited

U.S. PATENT DOCUMENTS

| 6,182,216 | B1 * | 1/2001 | Luyster ...................... 713/168 |
| 6,768,684 | B2 * | 7/2004 | Rarick |
| 7,236,592 | B2 * | 6/2007 | Coppersmith et al. ......... 380/37 |
| 7,266,703 | B2 * | 9/2007 | Anand et al. ................. 713/189 |
| 7,289,524 | B2 * | 10/2007 | Milliken et al. ............. 370/419 |

| 2002/0041685 | A1 * | 4/2002 | McLoone et al. ............. 380/45 |
| 2006/0126835 | A1 * | 6/2006 | Kim et al. .................... 380/44 |

OTHER PUBLICATIONS

"Announcing the Advanced Encryption Standard (AES)," Federal Information Processing Standards Publication 197, Nov. 26, 2001, (51 Pages).*
R. Rivest, "RFC1321" http://www.faqs.org/rfcs/rfc1321.html, Apr. 1992, (18 pages).*
"Announcing the Secure Hash Standard," Federal Information Processing Standards Publication 180-2, Aug. 1, 2002, (71 Pages).*
Cryptography and Network Security.*

* cited by examiner

*Primary Examiner*—Pramila Parthasarathy
(74) *Attorney, Agent, or Firm*—Robert C. Kowert; Anthony M. Petro; Meyertons, Hood, Kivlin, Kowert & Goetzel, P.C.

(57) ABSTRACT

An apparatus and method for implementing a block cipher algorithm. In one embodiment, a cryptographic unit configured to implement a block cipher algorithm may include state storage configured to store cipher state, where the cipher state includes a plurality of rows and a plurality of columns. The cryptographic unit may further include a cipher pipeline comprising a plurality of pipeline stages, where each pipeline stage is configured to perform a corresponding step of the block cipher algorithm on the cipher state, and where a given one of the pipeline stages is configured to concurrently process fewer than all of the columns of the cipher state.

27 Claims, 12 Drawing Sheets

| Fetch (F) | T0 | T3 | T6 | T2 | T7 | T5 | T1 | T4 |
|---|---|---|---|---|---|---|---|---|
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

FIG. 3

| Cycle | 1 | 2 | 3 | 4 | 5 | 6 | 7 |
|---|---|---|---|---|---|---|---|
| Stage 0 (ShiftRows) | SR01(1) | SR23(1) | | SR01(2) | SR23(2) | | |
| Stage 1 (SubBytes) | | SB01(1) | SB23(1) | | SB01(2) | SB23(2) | . . . |
| Stage 2 (MixColumns/ AddRoundKey) | | | MC01(1) ARK01(1) | MC23(1) ARK23(1) | | MC01(2) ARK01(2) | MC23(2) ARK23(2) |

| Cycle | 1 | 2 | 3 | 4 | 5 | 6 | 7 | 8 |
|---|---|---|---|---|---|---|---|---|
| Stage 1 (SubWord) | SW(w4) | | | SW(w8) | | | SW(w12) | |
| Stage 2 (RotWord/ XOR/Rcon) | | RW/XOR (w4,w5) | XOR (w6,w7) | | RW/XOR (w8,w9) | XOR (w10,w11) | | ... |

*FIG. 12A*

| Cycle | 1 | 2 | 3 | 4 | 5 | 6 | 7 | 8 |
|---|---|---|---|---|---|---|---|---|
| Stage 1 (SubWord) | SW(w4) | | | | | SW(w8) | | |
| Stage 2 (RotWord/ XOR/Rcon) | | RW/XOR (w4) | XOR(w5) | XOR(w6) | XOR(w7) | | RW/XOR (w8) | ... |

*FIG. 12B*

| Cycle | 1 | 2 | 3 | 4 |
|---|---|---|---|---|
| Stage 1 (SubWord) | SW(w4) | | SW(w8) | |
| Stage 2 (RotWord/ XOR/Rcon) | | RW/XOR (w4,w5,w6,w7) | | RW/XOR (w8,w9,w10,w11) | ... |

*FIG. 12C*

APPARATUS AND METHOD FOR IMPLEMENTING A BLOCK CIPHER ALGORITHM

BACKGROUND OF THE INVENTION

1. Field of the Invention

This invention relates to processors and, more particularly, to implementation of cryptographic algorithms.

2. Description of the Related Art

Securing transactions and communications against tampering, interception and unauthorized use has become a problem of increasing significance as new forms of electronic commerce and communication proliferate. For example, many businesses provide customers with Internet-based purchasing mechanisms, such as web pages via which customers may convey order and payment details. Such details often include sensitive information, such as credit card numbers, that might be subject to fraudulent use if intercepted by a third party.

To provide a measure of security for sensitive data, cryptographic algorithms have been developed that may allow encryption of sensitive information before it is conveyed over an insecure channel. The information may then be decrypted and used by the receiver. However, as the performance of generally available computer technology continues to increase (e.g., due to development of faster microprocessors), less sophisticated cryptographic algorithms become increasingly vulnerable to compromise or attack.

More sophisticated cryptographic algorithms are continually evolving to meet the threat posed by new types of attacks. However, as cryptographic algorithms become increasingly powerful, they often become computationally more complex to implement, potentially adding overhead to secure transactions and consequently reducing their performance. Further, implementing such algorithms within processor hardware presents additional challenges, such as mitigation of the impact of the additional hardware on processor area, power consumption, routing and floorplanning, etc.

SUMMARY

Various embodiments of an apparatus and method for implementing a block cipher algorithm are disclosed. In one embodiment, a cryptographic unit configured to implement a block cipher algorithm may include state storage configured to store cipher state, where the cipher state includes a plurality of rows and a plurality of columns. The cryptographic unit may further include a cipher pipeline comprising a plurality of pipeline stages, where each pipeline stage is configured to perform a corresponding step of the block cipher algorithm on the cipher state, and where a given one of the pipeline stages is configured to concurrently process fewer than all of the columns of the cipher state.

In one specific implementation of the cryptographic unit, the implementation area of the given pipeline stage may be proportional to the number of the columns that the given pipeline stage is configured to concurrently process.

A method is further contemplated that in one embodiment may include storing cipher state of a block cipher algorithm, where the cipher state includes a plurality of rows and a plurality of columns, and executing the block cipher algorithm in a plurality of pipeline stages, where each pipeline stage is configured to perform a corresponding step of the block cipher algorithm on the cipher state, and where a given one of the pipeline stages is configured to concurrently process fewer than all of the columns of the cipher state.

BRIEF DESCRIPTION OF THE DRAWINGS

FIG. 3 is a pipeline diagram illustrating the flow of instructions through one embodiment of a processor core.

FIGS. 12A-C are pipeline diagrams illustrating the operation of exemplary embodiments of key expansion pipelines.

Figure 1:
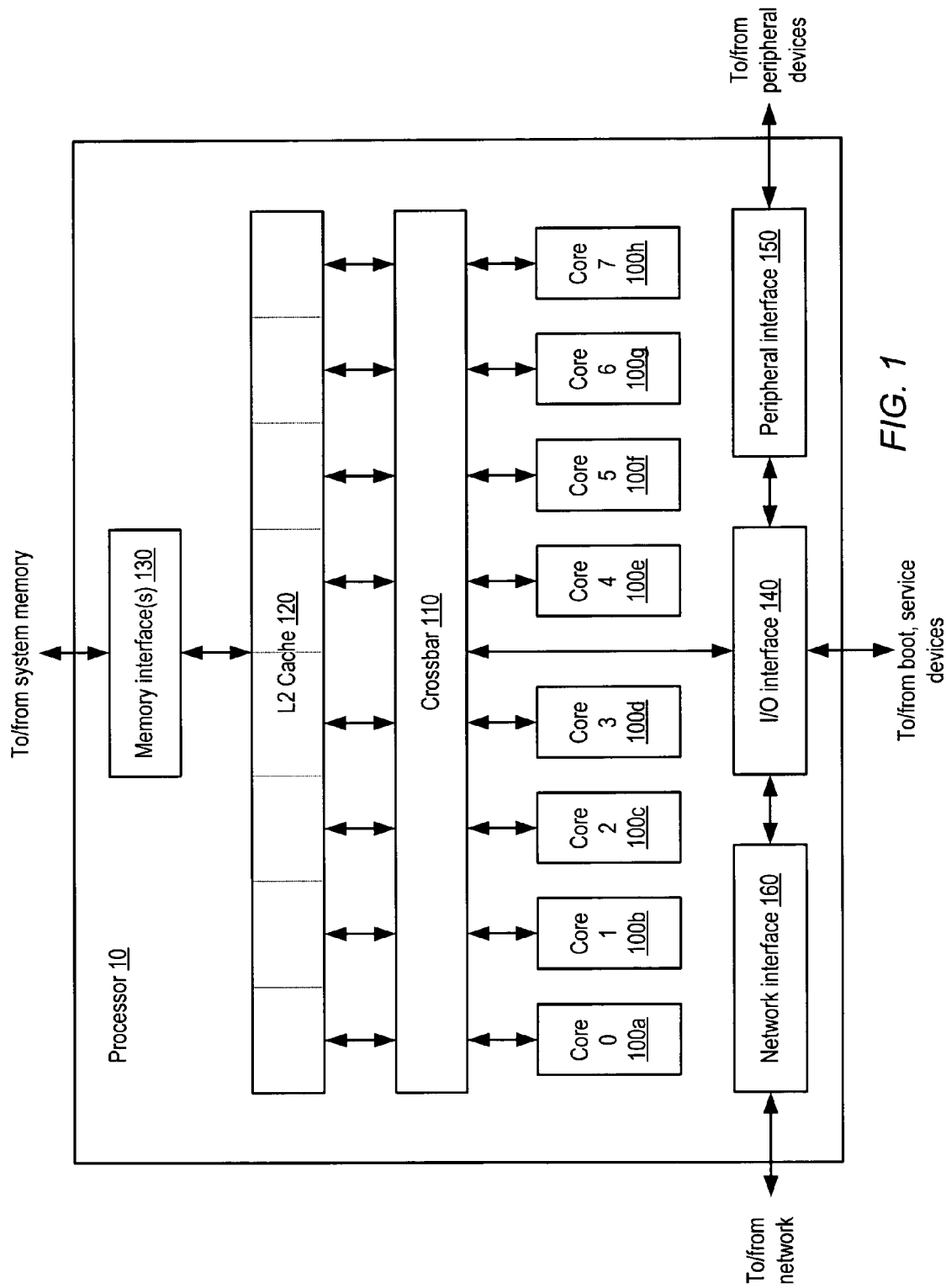
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads. For example, in various embodiments more or fewer than eight cores 100 may be provided, and some cores 100 may be configured to concurrently process eight or more threads while other cores 100 may be configured to concurrently process eight or fewer threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (e.g., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
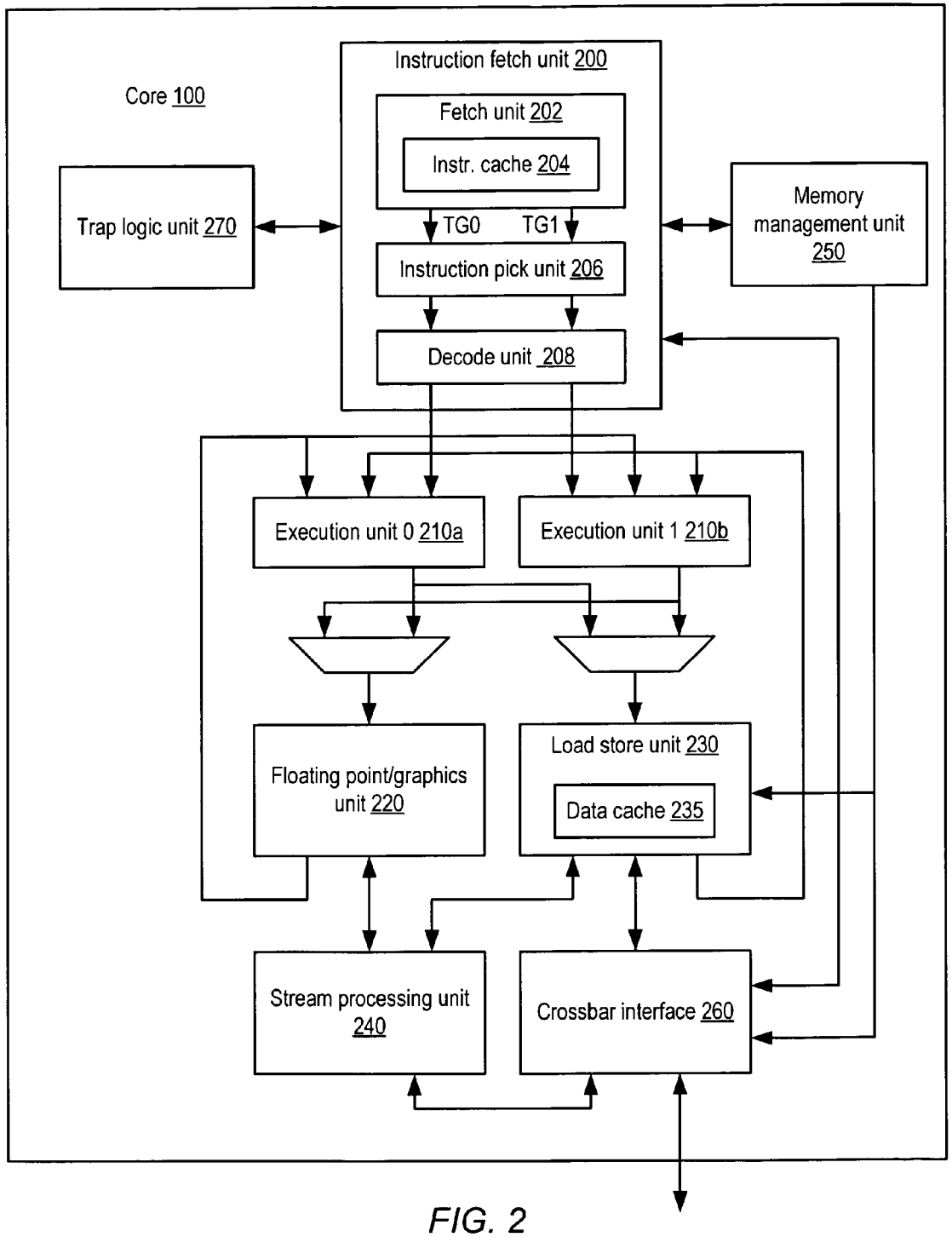
FIG. 2 is a block diagram illustrating one embodiment of a processor core configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction issue or execution. For example, in one embodiment SPU 240 may be configured to receive operations and operands via control registers accessible via software; in the illustrated embodiment SPU 240 may access such control registers via LSU 230. In such embodiments, SPU 240 may be indirectly programmed or configured by instructions issued from IFU 200, such as instructions to read or write control registers. However, even if indirectly programmed by such instructions, SPU 240 may execute independently without further interlock or coordination with IFU 200. In another embodiment SPU 240 may receive operations (e.g., instructions) and operands decoded and issued from the instruction stream by IFU 200, and may execute in response to such operations. That is, in such an embodiment SPU 240 may be configured as an additional functional unit schedulable from the instruction stream, rather than as an independent coprocessor.

In some embodiments, SPU 240 may be configured to freely schedule operations across its various algorithmic sub-units independent of other functional unit activity. Additionally, SPU 240 may be configured to generate memory load and store activity, for example to system memory 810 described below. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Cipher Algorithm Execution

As noted above, in some embodiments SPU 240 may be configured to implement different types of data processing algorithms. In one embodiment, SPU 240 may be configured to implement one or more cryptographic algorithms, and may be alternately referred to as a cryptographic unit (although it is noted that SPU 240 may also implement non-cryptographic algorithms in addition to or instead of cryptographic algorithms). In some embodiments, SPU 240 may be configured to implement one or more block cipher algorithms. Generally speaking, a block cipher algorithm is a class of cryptographic algorithm in which multiple bits of a message may be encrypted and/or decrypted as a group, in contrast to stream cipher algorithms in which a given bit of a message may be individually encrypted/decrypted before progressing to another bit.

One example of a block cipher algorithm is given by the Advanced Encryption Standard (AES), one version of which is published as Federal Information Processing Standards Publication 197 (FIPS 197), dated Nov. 26, 2001. In the FIPS 197 specification, the AES algorithm is described as operating on 128-bit data blocks using cipher keys of 128, 192 or 256 bits. However, it is contemplated that the AES algorithm or another suitable block cipher algorithm may be implemented using different block and/or key sizes.

Figure 4:
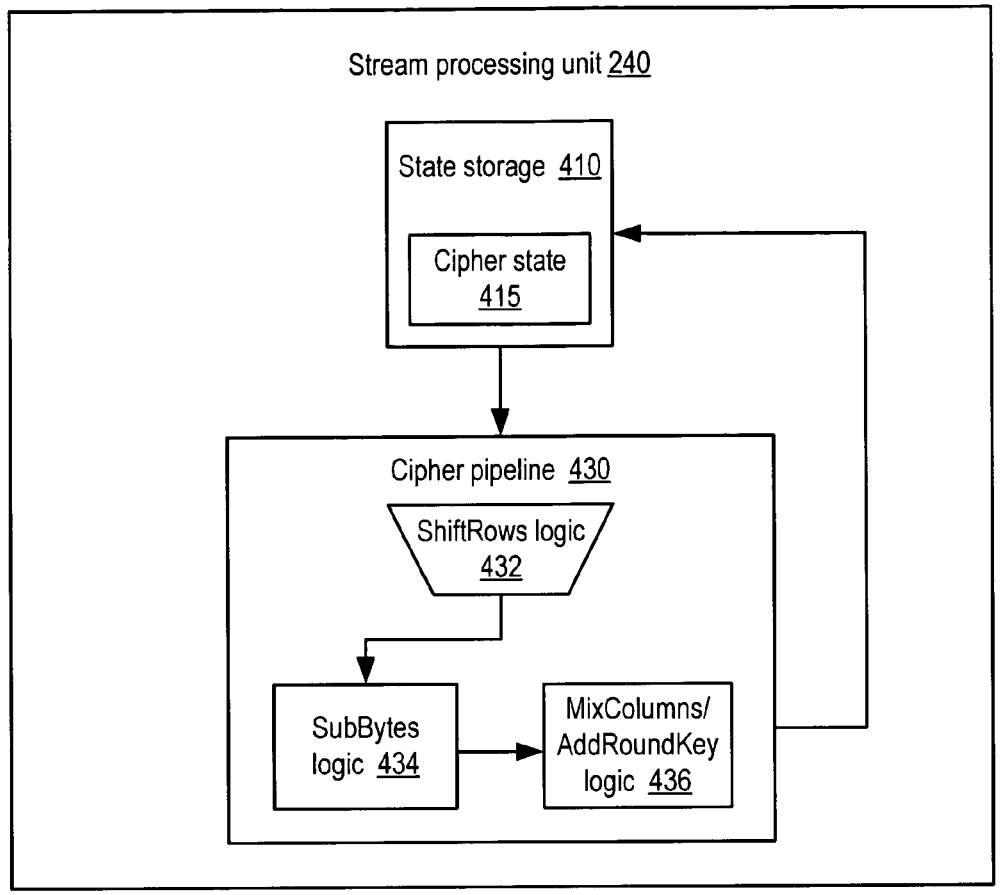
FIG. 4 is a block diagram illustrating one embodiment of a cryptographic unit configured to implement a block cipher algorithm.

One embodiment of a cryptographic unit configured to implement a block cipher algorithm is illustrated in FIG. 4. In the illustrated embodiment, SPU 240 includes state storage 410 coupled to cipher pipeline 430. Cipher pipeline 430 includes ShiftRows (SR) logic 432 coupled to SubBytes (SB) logic 434, which is in turn coupled to MixColums/AddRoundKey (MC/ARK) logic 436. Cipher pipeline 430 is also coupled to write output to state storage 410. In various embodiments, SPU 240 may also include additional logic not shown, such as cipher algorithm control logic and/or logic configured to perform different types of operations. Collectively, the illustrated features of SPU 240 may be configured to implement the AES algorithm as described below, although in other embodiments SPU 240 may implement other block cipher algorithms using similar techniques. It is noted that in some embodiments, SR logic 432 may be included within state storage 410 or coupled between state storage 410 and cipher pipeline 430.

State storage 410 may be any type of structure suitable for storing the cipher state operated on by the implemented block cipher algorithm, illustrated as cipher state 415. For example, in various embodiments state storage 410 may be configured as a register file, a random access memory (RAM), a queue, or any other suitable data structure. In some embodiments, state storage 410 may provide storage for state in addition to cipher state 415. For example, cipher state 415 may include state (such as a data block) currently undergoing iterative processing by cipher pipeline 430. Additionally, in one embodiment, state storage 410 may provide additional storage for a next data block to be processed after processing of cipher state 415 completes. After processing of current cipher state 415 completes, a next data block may become the new value of cipher state 415.

Figure 5:
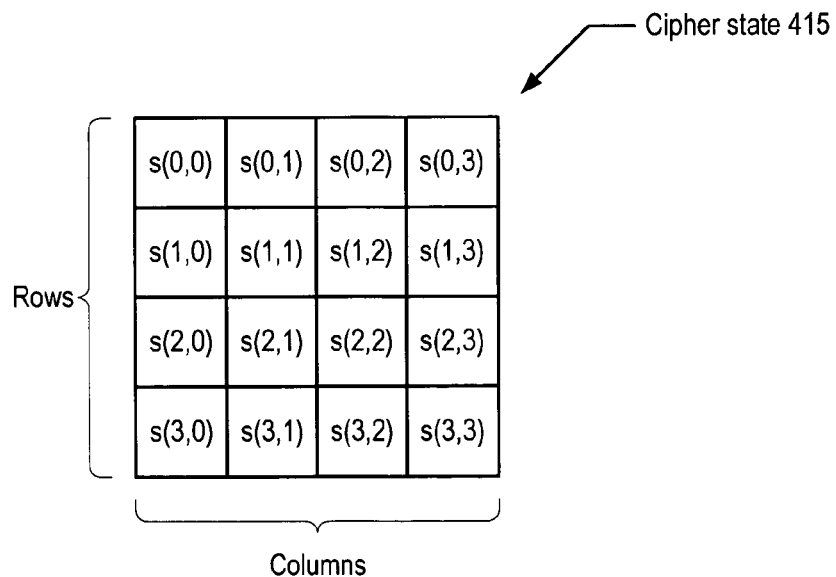
FIG. 5 is a block diagram illustrating one embodiment of cipher state.

In some block cipher algorithms, such as the AES algorithm, cipher state 415 may include a plurality of rows and columns arranged as a two-dimensional array. One such arrangement is illustrated in FIG. 5, in which cipher state 415 includes four rows and four columns. The intersection of each row and column may represent a byte of the cipher state, and each word in the illustrated embodiment is denoted as s(M,N) where M denotes a row number ranging from 0 to 3 and N denotes a column number, also ranging from 0 to 3. In the illustrated embodiment, the sixteen illustrated bytes of cipher state 415 correspond to the 128-bit block size specified by one version of the AES algorithm. However, it is noted that in other embodiments, cipher state 415 may include different numbers of rows and columns. For example, for some block cipher algorithms having a block size larger than 128 bits, cipher state 415 may include additional columns, rows, or both. Further, in some embodiments it is contemplated that cipher state 415 may include dimensions in addition to rows and columns. In such embodiments, a given column may be orthogonal to each other dimension of cipher state 415.

In the illustrated embodiment, cipher pipeline 430 may be configured to implement steps of a block cipher algorithm, such as the AES algorithm. One pseudocode representation of a version of the AES algorithm configured to encrypt a data block is given below:

```
Cipher(byte in[4*Nb], byte out[4*Nb], word w[Nb*(Nr+1)])
  begin
  byte state[4,Nb]
  state = in
  AddRoundKey(state, w[0, Nb−1])
  for round = 1 step 1 to Nr−1
    SubBytes(state)
    ShiftRows(state)
    MixColumns(state)
    AddRoundKey(state, w[round*Nb, (round+1)*Nb−1])
  end for
  SubBytes(state)
  ShiftRows(state)
  AddRoundKey(state, w[Nr*Nb, (Nr+1)*Nb−1])
  out = state
  end
```

In this representation, Nb represents the number of bytes comprising a row of cipher state 415, which corresponds to the "state" variable illustrated in the pseudocode. For example, for a 128-bit block size as described above, cipher state 415 may comprise four rows of four bytes each (Nb=4). Also, Nr represents the number of iterations, also referred to as rounds, performed by the algorithm on cipher state 415. For the illustrated version of the AES algorithm, the number of rounds may depend on the size of the cipher key. For example, for cipher keys of 128 bits, 192 bits and 256 bits, the corresponding number of rounds may be 10, 12 and 14, respectively. The variables "in" and "out" are placeholders for the input data block to be encrypted and the resulting data block, respectively. The variable "w" includes a string of Nr+1 cipher keys, each Nb bytes in length. (The details of cipher key generation, which are not essential to the operation of the AES algorithm itself, are discussed in greater detail below.)

Following an initial step of adding a key to cipher state 415, each round in the iterative loop of the above representation of the AES algorithm includes applying four functions or steps to cipher state 415: SubBytes, ShiftRows, MixColumns, and AddRoundKey. (Each of these may be generically referred to as a byte-substitution step, a row-shifting step, a column-mixing step, and an add-round-key step, respectively.) In one embodiment, the SubBytes (SB) function may include applying a particular transformation to each byte of cipher state 415, which in one implementation of the AES algorithm may include taking a multiplicative inverse of the byte as defined in the finite Galois field $GF(2^8)$ and applying an affine transformation to the result. The ShiftRows (SR) function may, in one embodiment, include cyclically shifting or rotating zero or more bytes of a given row of cipher state 415 from a lower-numbered column to a higher-numbered column. For example, in one embodiment the SR function may leave row 0 of cipher state 415 unmodified, shift byte s(1,0) to column 3 while shifting the remaining bytes of row 1 left one column, shift bytes s(2,0) and s(2,1) to columns 2 and 3, respectively, while shifting the remaining bytes of row 2 left two columns, and shift bytes s(3,0), s(3,1) and s(3,2) to columns 1, 2 and 3, respectively, while shifting the remaining byte of row 3 left three columns.

In one embodiment, the MixColumns (MC) function may include multiplying each column of cipher state 415 by a fixed matrix, which may represent a polynomial multiplication in $GF(2^8)$. Finally, the AddRoundKey (ARK) function may, in one embodiment, include adding a cipher key appropriate to the particular round to each column of cipher state 415. It is noted that in some embodiments, mathematical operations defined over field elements may differ in implementation from ordinary integer arithmetic. For example, addition of field elements may be implemented as an exclusive-OR (XOR) operation rather than an integer addition operation. More details about each of the AES functions described above may be found in the FIPS 197 publication referenced above. It is noted that in some embodiments, block cipher algorithms may include different function of the cipher state than those shown above.

The various elements of cipher pipeline 430 may be configured to implement corresponding functions or steps of the implemented block cipher algorithm. For example, in the illustrated embodiment cipher pipeline 430 may be configured to implement the AES algorithm. In one embodiment, SR logic 432 may be configured as fixed or selectable circular shift logic, for example using multiplexers. SB logic 434 may be configured to perform a byte substitution for bytes of cipher state 415 as defined by the transformation specified by the block cipher algorithm. For example, the transformation may be precomputed for all possible byte values and stored as a table in a read-only memory (ROM), an active logic structure such as a collection of multiplexers (such as described in, e.g., U.S. Pat. No. 6,768,684, "System and method for small read only data") or another suitable data structure. Alternatively, rather than store a precomputed transformation table, SB logic 434 may include logic configured to actively compute the transformation value as needed.

In the illustrated embodiment, the MC and ARK functions are combined within MC/ARK logic 436. For example, the MC function may be implemented as a collection of XOR logic gates followed by an additional level of XOR logic to compute the ARK function. Additionally, cipher pipeline 430 may include additional logic, such as pipeline registers and/or other control logic, configured such that execution of the block cipher algorithm may be pipelined over several stages, as described in greater detail below.

Within each round of the pseudocode representation of AES shown above, each function operates on the entire cipher state 415. However, configuring each element of cipher pipeline 430 to concurrently process all of cipher state 415 may require substantial hardware resources, complicating design and increasing the area required by the implementation, which may impact the cost, power requirements and/or manufacturability of a system including SPU 240. For example, for SB logic 434 to concurrently process all of cipher state 415 as illustrated in FIG. 5, SB logic 434 would require 128-bit wide input and output paths, which may result in a large, wire-bound implementation. Such implementation concerns may be multiplied in embodiments where numerous instances of SPU 240 are implemented, such as in multithreaded processor 10 of FIG. 1, for example.

Figures 6, 7:
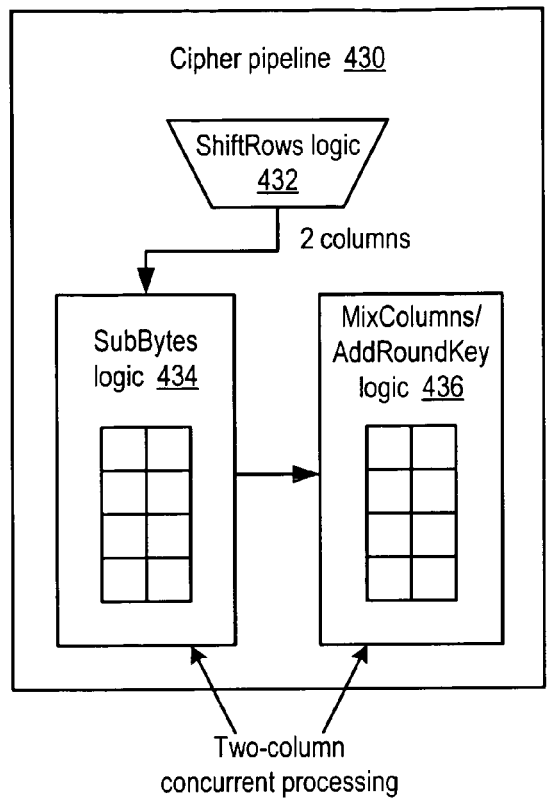
FIG. 6 is a block diagram illustrating one embodiment of a cipher pipeline configured to concurrently process fewer than all columns of cipher state.
FIG. 7 is a pipeline diagram illustrating the operation of one embodiment of a cipher pipeline.

In the embodiment illustrated in FIG. 6, the various pipeline stages implemented within cipher pipeline 430 may be configured to concurrently process fewer than all of the columns of cipher state 415, thereby potentially reducing the area required to implement the block cipher algorithm. In the illustrated embodiment, each of SB logic 434 and MC/ARK logic 436 may be configured as a distinct pipeline stage, while the execution timing of SR logic 432 may overlap with the MC/ARK pipeline stage as illustrated in FIG. 7. However, it is contemplated that in other embodiments, the logic included in cipher pipeline 430 may be differently partitioned among pipeline stages.

In the embodiment of FIG. 6, SR logic 432 may be configured to select and shift two of the columns of cipher state 415, and to convey the two shifted columns to SB logic 434. During a given execution cycle or time slot, SB logic 434 and MC/ARK logic 436 each may be configured to perform the appropriate byte substitution and to perform the MixColumn/AddRoundKey functions, respectively, on two columns of cipher state 415. By configuring each pipeline stage to process two columns concurrently rather than all four columns of cipher state 415, in one embodiment the corresponding logic area may be reduced by approximately half. More generally, for some embodiments of cipher pipeline 430, the implementation area required by a given pipeline stage may be proportional to the number of columns of cipher state 415 the given pipeline stage is configured to concurrently process.

It is noted that the order of functions suggested by the AES pseudocode given above may not be ideal for area reduction using a datapath configured to concurrently process fewer than all columns of cipher state 415. In the pseudocode, SubBytes is performed before ShiftRows. However, for the AES algorithm, a given output byte of the SubBytes function is dependent only on a single input byte, whereas a given output byte of the ShiftRows function is dependent upon potentially all of the bytes in a row of cipher state 415. Consequently, if SubBytes is implemented prior to ShiftRows within cipher pipeline 430, it may be necessary to perform SubBytes on all columns of cipher state 415 before ShiftRows begins. This may in turn require additional temporary storage in addition to cipher state 415 in which columns of state on which SubBytes has already been performed may be held while remaining columns are processed. Such additional storage may partially negate the area benefit realized by implementing fewer columns. Additionally, delaying execution of ShiftRows until SubBytes has been performed on all of cipher state 415 may lengthen the execution pipeline, increasing the latency of algorithm execution.

Because the SubBytes function, in AES, is an independent mapping of an input byte to an output byte, the result of performing SubBytes followed by ShiftRows on all columns of cipher state 415 is equivalent to the result of performing ShiftRows followed by SubBytes, even though the intermediate results may differ. Since cipher state 415 includes all columns of the cipher state, implementing ShiftRows (which may depend on multiple columns) prior to SubBytes (which does not) may avoid the need for temporary storage and possible pipeline delays described above. In the illustrated embodiment, SR logic 432 may be configured to perform the ShiftRows function with respect to two output columns at a time, referring to all columns of cipher state 415 as necessary for a given row. Subsequently, SB logic 434 and MC/ARK logic 436 may perform their steps of the AES algorithm on two columns at any given time.

A pipeline diagram illustrating the execution of one embodiment of cipher pipeline 430 is shown in FIG. 7. In the illustrated diagram, a portion of the iterative loop of the AES algorithm is shown, beginning with round 1. The round to which a given operation corresponds is indicated in parentheses. In cycles 1 and 2, SR logic 432 is configured to perform the ShiftRows step concurrently on columns 0 and 1, followed by columns 2 and 3. Similarly, in cycles 2 and 3, SB logic 434 is configured to perform the SubBytes step concurrently on columns 0 and 1, followed by columns 2 and 3. Finally, in cycles 3 and 4, MC/ARK logic 436 is configured to perform the MixColumns and AddRoundKey steps concurrently on columns 0 and 1, followed by columns 2 and 3. In one embodiment, cipher pipeline 430 may be configured to write the columns output by a round back to cipher state 415 after the MC/ARK step. Also, in cycle 4, SR logic 432 is configured to begin processing columns 0 and 1 for round 2, which may depend on the output of the MC/ARK step produced during cycle 4.

It is noted that in one embodiment, the SR step for a given round that is performed by SR logic 432 may temporally overlap with the pipeline stage configured to perform the MC/ARK step for a previous round. For example, in the embodiment illustrated in FIG. 7, the SR step of round 2 for columns 0 and 1 (denoted SR01(2)) may be configured to execute at the end of cycle 4, after the MC/ARK step of round 1 for columns 2 and 3 has been completed. The SR step may equally validly be shown as occurring in pipeline stage 2 along with the MC/ARK step, or in other embodiments, as part of stage 1 prior to the SB step.

In some embodiments, the area required by cipher pipeline 430 may be reduced still further. In the embodiment illustrated in FIG. 8, each stage of cipher pipeline 430 is configured to concurrently process one column of cipher state 415. The details of configuration and operation of the illustrated embodiment are analogous to those of the embodiment of FIG. 6, with the exception that SR logic 432 may select one column per cycle from cipher state 415, and SB logic 434 and MC/ARK logic 436 may each process one column per cycle. A corresponding pipeline diagram is given in FIG. 9, which may be interpreted similarly to the diagram of FIG. 7. In the illustrated embodiment, a given round completes five cycles after the first column enters SR logic 432, in contrast to the embodiment of FIG. 6, in which a given round completes three cycles after the first two columns enter SR logic 432.

It is contemplated that in other embodiments, different numbers of columns may be implemented for concurrent execution within cipher pipeline 430. For example, if cipher state 415 included six columns, different area vs. latency tradeoffs may be achieved by implementing one, two or three columns for concurrent execution within cipher pipeline 430. It is also possible to implement more than half, but fewer than all columns of cipher state 415 for concurrent execution, although these solutions may be less than optimal tradeoffs of area vs. latency.

It is noted that while the pseudocode example of the AES block cipher algorithm given above illustrated the behavior of a cipher encryption operation, cipher decryption operation may use inverse functions in a similar fashion. For example, a decryption round of the AES algorithm may apply the inverses of the SubBytes, ShiftRows, AddRoundKey and MixColumns functions in that order. In some embodiments, cipher pipeline 430 may be configured to implement the appropriate inverse functions for decryption, either by reconfiguring encryption logic or providing separate logic. During decryption, cipher pipeline 430 may concurrently process fewer than all columns of cipher state 415 in a manner similar to that described above and illustrated in FIGS. 6-9.

Figure 10:
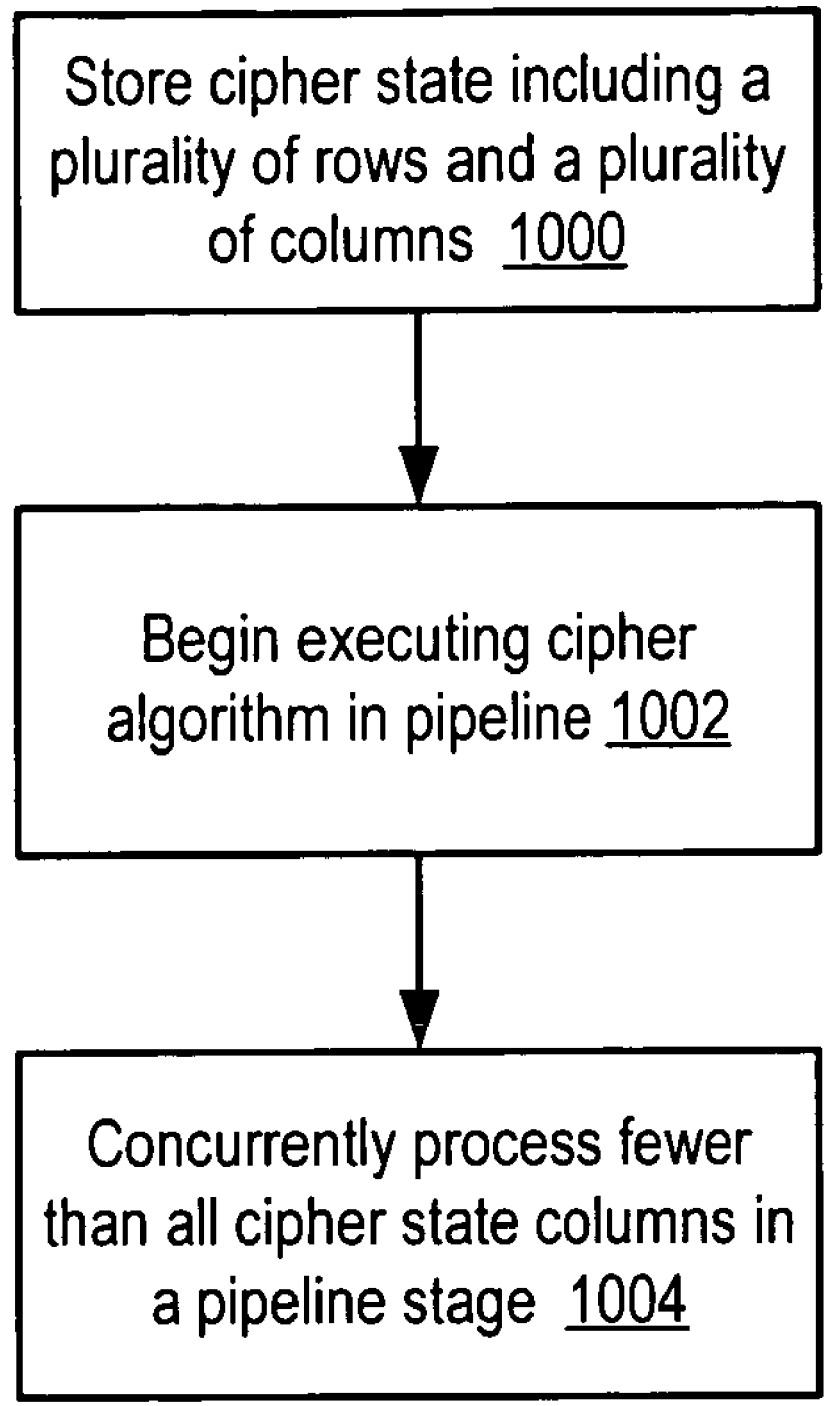
FIG. 10 is a flow diagram illustrating the operation of one embodiment of a cryptographic unit.

A flow chart illustrating the operation of one embodiment of a cryptographic unit is shown in FIG. 10. Referring collectively to FIGS. 4-9, operation begins in block 1000 where cipher state including a plurality of rows and a plurality of columns is stored. For example, in one embodiment cipher state 415 may be stored within state storage 410 of SPU 240 as described above.

Subsequently, pipelined execution of a block cipher algorithm begins (block 1002). For example, in one embodiment cipher pipeline 430 may be configured to begin pipelined execution of the AES algorithm on cipher state 415. During the course of pipelined execution, fewer than all columns of the cipher state are processed in a pipeline stage (block 1004). For example, in the embodiments described above, the pipeline stages SB logic 434 and MC/ARK logic 436 may be configured to concurrently process one or two columns of cipher state 415.

Cipher Key Expansion

Generally speaking, cipher algorithms use one or more cipher keys in combination with a message in order to perform encryption/decryption of the message. For example, various versions of the AES algorithm may use an initial cipher key of 128, 192 or 256 bits, which may be supplied to the algorithm as an argument along with the message or data block to be encrypted/decrypted. For some cipher algorithms that iterate over multiple rounds, a different key may be used for each round of the cipher. The AES algorithm described above may use a unique 128-bit key for each cipher round following application of the initial key. Thus, for initial AES cipher key lengths of 128, 192 and 256 bits requiring 10, 12 and 14 rounds, respectively, a total of 11, 13, or 15 128-bit keys are required to provide a unique key per round following application of the initial key.

For some cipher algorithm embodiments that require additional cipher keys per round, the unique cipher keys for each round may be generated from the initial cipher key according to a key expansion algorithm. The set of keys resulting from the operation of the key expansion algorithm may be referred to as the expanded set of keys for the corresponding cipher algorithm, and each member of the expanded set may correspond to a particular round of the cipher algorithm. (In some embodiments, the expanded set of keys may also include the initial cipher key.) One pseudocode representation of an AES key expansion algorithm is given below:

```
KeyExpansion(byte key[4*Nk], word w[Nb*(Nr+1)], Nk)
  begin
    word temp
    i = 0
    while (i < Nk)
      w[i] = word(key[4*i], key[4*i+1], key[4*i+2], key[4*i+
        3])
      i = i+1
    end while
    i = Nk
    while (i < Nb * (Nr+1)]
      temp = w[i-1]
      if (i mod Nk = 0)
        temp = SubWord(RotWord(temp)) xor Rcon[i/Nk]
      else if (Nk > 6 and i mod Nk = 4)
        temp = Subword(temp)
      end if
      w[i] = w[i-Nk] xor temp
      i = i+
    end while
  end
```

In this representation, as before, Nb represents the number of bytes comprising a row of the cipher state processed by the AES algorithm, and Nr represents the number of rounds performed by the algorithm. In some AES versions, Nb=4, and Nr may vary according to the size of the initial cipher key as described above. Further, Nk represents the number of 32-bit words comprising the initial cipher key. For example, for 128-bit, 196-bit and 256-bit initial cipher keys, Nk equals 4, 6 and 8, respectively.

In the pseudocode above, the array w may represent the expanded set of cipher keys and may include Nb*(Nr+1) 32-bit words. Where Nb=4, the expanded set may also be considered to include Nr+1 128-bit members, each of which may be referred to as a round key. The expanded set of cipher keys may also be referred to as the key schedule. The pseudocode illustrating the AES cipher algorithm as given above shows how the algorithm may progress through the expanded key set as rounds of the algorithm complete.

In this particular key expansion algorithm, the initial cipher key is copied into the first Nk 32-bit words of the expanded set, as illustrated by the first while loop. Subsequently, in most cases each 32-bit word of the expanded set is a logical exclusive-OR (XOR) function of the immediately previous word and the Nk-previous word. That is, word i of the expanded set is generally a function of word i−1 and word i−Nk.

As illustrated in the key expansion algorithm, for every Nk words (that is, for each word i of the expanded set for which i mod Nk=0), several transformations are applied to word i−1 prior to the XOR with word i-Nk. Specifically, the RotWord transformation may, in one embodiment, cyclically rotate the bytes of word i−1 left by one byte position. It is noted that in some embodiments, the RotWord transformation may be analogous to the ShiftRows transformation of the AES cipher algorithm for row 1 of the cipher state, as described above. Additionally, the SubWord transformation may, in one embodiment, comprise applying the SubBytes function of the AES cipher algorithm, as described above, to each byte of word i−1. Following the SubWord transformation, the resulting word is XORed with a round constant Rcon, which may vary according to the specific word i being generated. It is noted that in the illustrated embodiment, when Nk=8 (i.e., a 256-bit initial AES cipher key is being used), an additional SubWord transformation is specified for each word i of the expanded set for which i mod Nk=4.

As an example, executing the above pseudocode for an initial AES cipher key of 128 bits (Nk=4) may result in words w[0] through w[3] being assigned the corresponding words of the initial cipher key. Subsequent words of the expanded set may be determined as follows:

```
w[4] = w[0] xor SubWord(RotWord(w[3])) xor Rcon[1]
w[5] = w[1] xor w[4]
w[6] = w[2] xor w[5]
w[7] = w[3] xor w[6]
w[8] = w[4] xor SubWord(RotWord(w[7])) xor Rcon[2]
w[9] = w[5] xor w[8]
w[10] = w[6] xor w[9]
w[11] = w[7] xor w[10]
. . .
```

In this embodiment, generation of the expanded set of cipher keys is generally dependent upon the initial cipher key in a sequential fashion, where later-generated cipher keys have increasing dependency on earlier-generated cipher keys.

Figure 11:
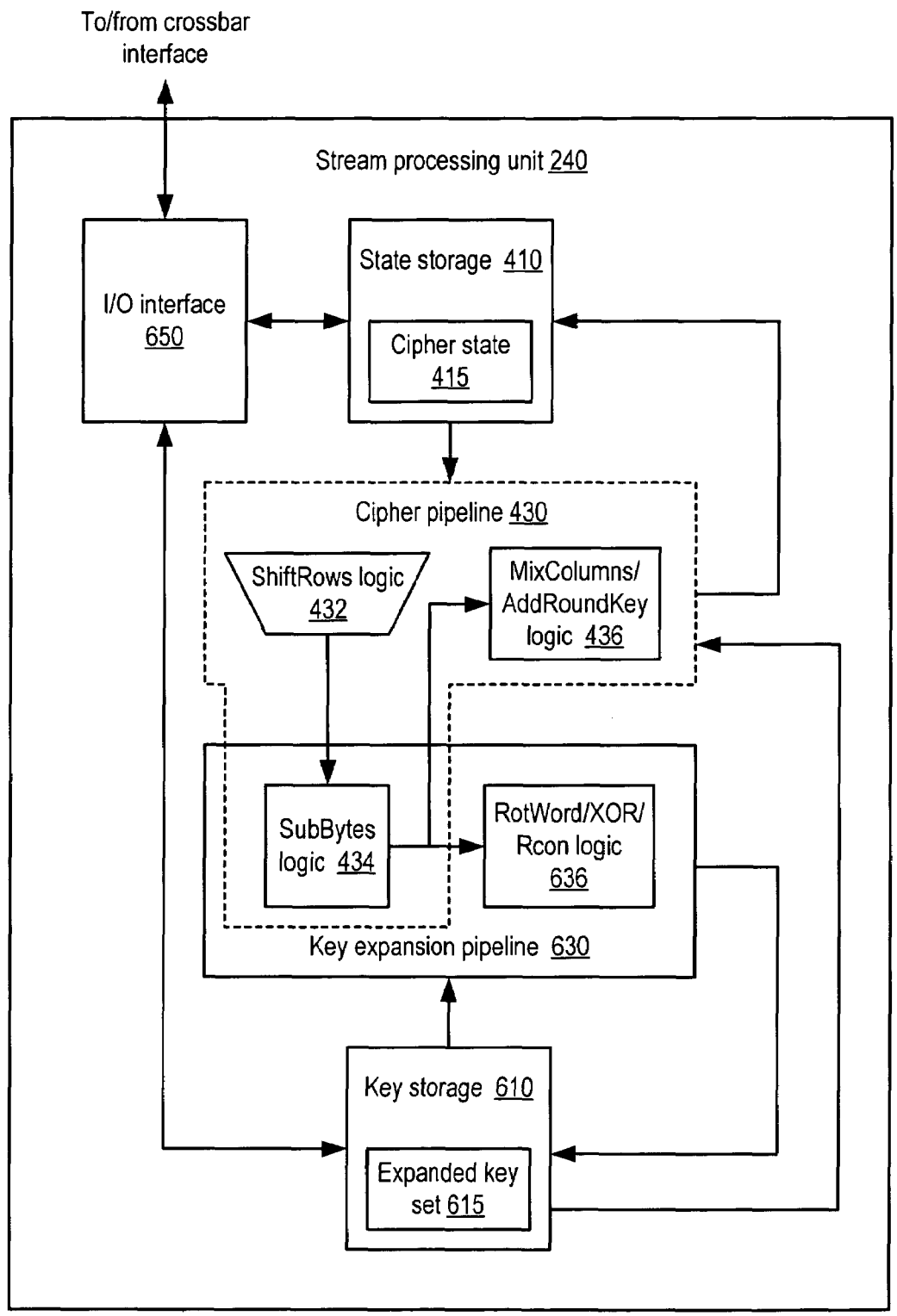
FIG. 11 is a block diagram illustrating one embodiment of a cryptographic unit configured to perform cipher key expansion.

One embodiment of a cryptographic unit configured to perform cipher key expansion in hardware is illustrated in FIG. 11. In the illustrated embodiment, SPU 240 includes state storage 410, cipher state 415, and cipher pipeline 430, which may be configured similarly to previously illustrated embodiments. Additionally, in the illustrated embodiment SPU 240 includes key storage 610, which may be configured to store expanded key set 615, which may be illustrative of the expanded key set described in the key expansion pseudocode example above. Key storage 610 is coupled to a key expansion pipeline 630, which is in turn coupled to return results to key storage 610. Key storage 610 is also coupled to cipher pipeline 430. Additionally, key storage 610 and state storage 410 are coupled to an input/output (I/O) interface 650, which in turn couples SPU 240 to crossbar interface 260 shown in FIG. 2, as discussed in greater detail following the discussion of the other elements below.

Like state storage 410, key storage 610 may be any type of structure suitable for storing the expanded key set 615 utilized by the implemented block cipher algorithm. For example, in various embodiments key storage 610 may be configured as a register file, a random access memory (RAM), a queue, or any other suitable data structure. In some embodiments, key storage 610 and state storage 410 may be implemented as a common storage structure. For example, both elements may be implemented within a single RAM that may be partitioned or managed by other logic within SPU 240.

In the illustrated embodiment, key expansion pipeline 630 includes SubBytes (SB) logic 434 coupled to RotWord/XOR/Rcon (RXR) logic 636. In one embodiment, SB logic 434 and RXR logic 636 may be implemented as pipeline stages configured to implement corresponding steps of generating a member of the expanded cipher key set according to a key expansion algorithm. For example, SB logic 434 may be configured to perform the SubBytes transformation that comprises the SubWord transformation illustrated in the AES key expansion algorithm pseudocode shown above. Further, RXR logic 636 may be configured to conditionally perform the RotWord and XOR functions shown in the AES key expansion algorithm, along with selecting the appropriate Rcon constant, if necessary. It is noted that in other embodiments, key expansion pipeline 630 may be partitioned differently into different stages and/or elements, and may implement functions in addition to or distinct from the AES key expansion functions illustrated.

As noted previously, in some embodiments certain functions of a key expansion algorithm may overlap with functions of a corresponding cipher algorithm. For example, the SubWord and RotWord functions used within the AES key expansion algorithm correspond directly to the SubBytes and ShiftRows functions used within the AES cipher algorithm. Where this functional overlap exists, in some embodiments implementation area and effort may potentially be reduced by sharing portions of key expansion pipeline 630 and cipher pipeline 430.

In the illustrated embodiment, SB logic 434 is shared between key expansion pipeline 630 and cipher pipeline 430. Further, SPU 240 may be configured to operate in a key expansion mode of operation, during which a key expansion algorithm executes, as well as a cipher mode of operation, during which a cipher algorithm executes. For example, SPU 240 may be configured to generate the complete set of expanded keys to be used during encryption/decryption in the key expansion mode of operation prior to commencing cipher execution during the cipher mode of operation.

During the key expansion mode of operation, the pipeline stages comprising key expansion pipeline 630 may be configured to perform corresponding steps of key expansion. Specifically, in the illustrated embodiment, SB logic 434 may be configured to perform the SubWord step, as appropriate.

During the cipher mode of operation, a portion of key expansion pipeline 630 may be configured to perform a portion of the cipher algorithm. Specifically, in the illustrated embodiment, SB logic 434 may be configured to perform the SubBytes function for the AES algorithm as described above. (It is noted that since SB logic 434 is shared by the two pipelines, it may be said equivalently that cipher pipeline 630 may be configured to perform a portion of the key expansion algorithm during the key expansion mode of operation.)

Figures 8, 9:
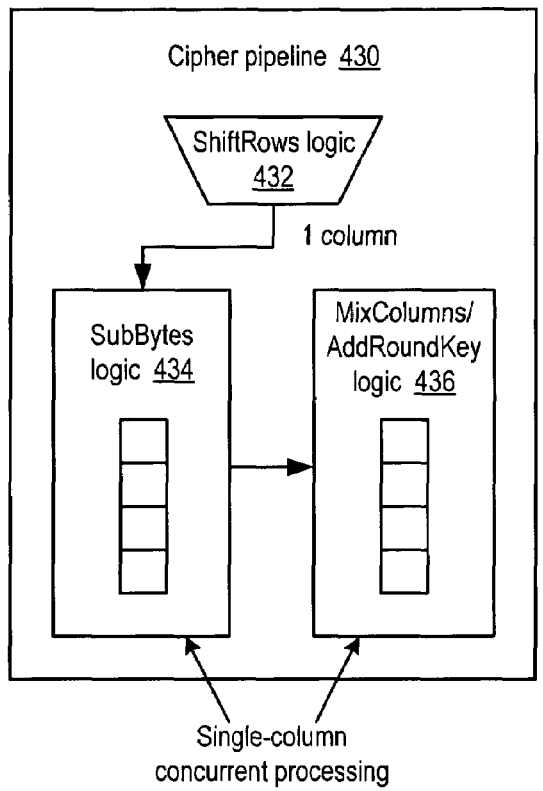
FIG. 8 is a block diagram illustrating another embodiment of a cipher pipeline configured to concurrently process fewer than all columns of cipher state.
FIG. 9 is a pipeline diagram illustrating the operation of another embodiment of a cipher pipeline.

It is noted that although the AES key expansion pseudocode given above illustrates that the innermost RotWord transformation is performed prior to the SubWord transformation, an equivalent result may be obtained by performing these transformations in the opposite order, as described above with respect to the ShiftRows and SubBytes functions of the AES cipher algorithm. In various embodiments of key expansion pipeline 630, these steps may be implemented in either order. Additionally, it is noted that in general, one or more portions of key expansion pipeline 630 may be configured to perform cipher algorithm steps regardless of whether any stage of cipher pipeline 430 is configured to concurrently process all or fewer than all columns of cipher state 415. That is, functional overlap and sharing may occur between key expansion pipeline 630 and cipher pipeline 430 in instances where cipher pipeline 430 concurrently processes all of cipher state 415, in addition to instances where stages of cipher pipeline 430 concurrently process fewer than all columns of cipher state 415 as illustrated in FIGS. 6 and 8.

In the illustrated embodiment, cipher pipeline 430 may be configured to retrieve and utilize cipher keys from expanded key set 615 during rounds of the cipher algorithm. In some embodiments, the rate at which cipher keys may be utilized by cipher pipeline 430 during a given round may depend on how cipher pipeline 430 is implemented. For example, one 32-bit word from expanded key set 615 may be applied to each column of cipher state 415 during the AddRoundKey step described above. In embodiments where all 4 columns of cipher state 415 concurrently undergo the AddRoundKey step, 4 32-bit words may be concurrently retrieved from key storage 610 and utilized. In embodiments where fewer than all columns are concurrently processed, a correspondingly narrower datapath from key storage 610 may be provided.

In some embodiments, the rate (e.g., the number of 32-bit words per cycle) at which cipher keys are generated and written into key storage 610 by key expansion pipeline 630 during key expansion may be configured to match the rate at which keys are read out of key storage 610 and utilized by cipher pipeline 430 during cipher operation. By balancing rates of key generation and utilization, the additional hardware (such as buses or register file ports, for example) needed by key storage 610 to support hardware key expansion may be minimized.

FIGS. 12A-C illustrate the operation of several exemplary embodiments of key expansion pipeline 630, configured for different rates of key generation. For each of FIGS. 12A-C, two pipeline stages are configured to perform key expansion. In one embodiment, stage 1 may be configured to implement the SubWord function shown in the key expansion pseudocode given above. In such an embodiment, stage 2 may be configured to implement the RotWord and XOR functions of the illustrated key expansion algorithm, and may conditionally include round constant Rcon in the XOR function as appropriate for the word being generated. In one embodiment, stage 1 may be implemented by SB logic 434, while stage 2 may be implemented by RXR logic 636, as shown in FIG. 11. It is contemplated that in other embodiments, different numbers of pipeline stages may be employed, and the key expansion algorithm may be differently partitioned among them.

In FIG. 12A, key expansion pipeline 630 is configured to generate words of the expanded key set at a rate matching the rate at which key words are utilized by an embodiment of cipher pipeline 430 that is configured to concurrently process two columns of cipher state 415, such as illustrated in the embodiment of FIG. 6. That is, key expansion pipeline 630 is configured to generate at most two key words per cycle. In cycle 1, the SubWord function is performed for word w4. In cycle 2, the RotWord function is applied to the resultant word w4, which is then combined with the appropriate Rcon constant in an XOR function. Word w5, which depends on word w4, is also generated during cycle 2. During cycle 3, words w6 and w7 are generated. In cycle 4, the SubWord function for word w8 (which depends on word w7) is performed, and execution continues in a similar fashion until the expanded key set is complete.

The operation of key expansion pipeline in FIG. 12B is largely similar to that of FIG. 12A, except that in FIG. 12B, key expansion pipeline 630 is configured to generate words of the expanded key set at a rate matching the rate at which key words are utilized by an embodiment of cipher pipeline 430 that is configured to concurrently process one column of cipher state 415, such as illustrated in the embodiment of FIG. 8. That is, in FIG. 12B, key expansion pipeline 630 is configured to generate at most one key word per cycle.

As mentioned previously, key expansion pipeline 630 may be used in embodiments where all columns of cipher state 415 are concurrently processed by cipher pipeline 430. In FIG. 12C, key expansion pipeline 630 is configured to generate at most four key words per cycle, which matches the rate of utilization by cipher pipeline 430 for a four-column implementation.

Figure 13:
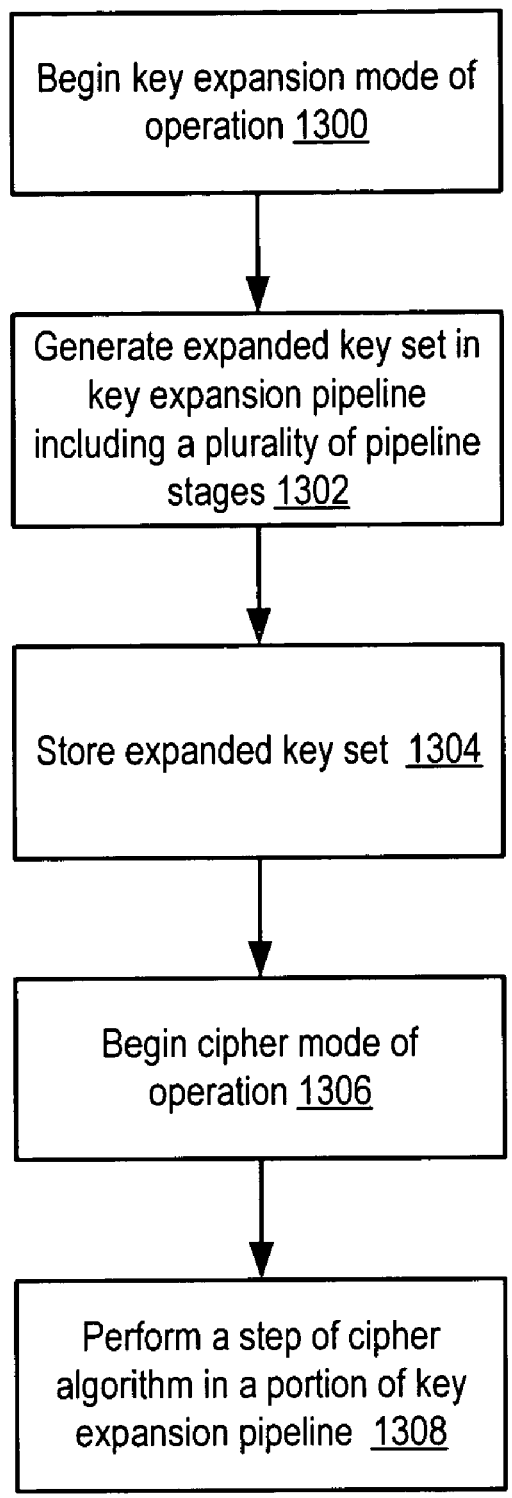
FIG. 13 is a flow diagram illustrating one embodiment of a method of cipher key expansion.

A flow chart illustrating one embodiment of a method of key expansion is illustrated in FIG. 13. Referring collectively to FIGS. 1-13, a key expansion mode of operation begins in block 1300. For example, SPU 240 may begin a key expansion mode of operation prior to executing a cipher algorithm. During the key expansion mode of operation, each of a plurality of pipeline stages performs a corresponding step of generating a member of an expanded set of cipher keys according to a key expansion algorithm (block 1302). For example, key expansion pipeline 630 may be configured to generate expanded key set 615 according to the AES key expansion algorithm.

Once generated, the expanded key set may be stored (block 1304). Subsequently, a cipher mode of operation begins (block 1306). During the cipher mode of operation, a portion of the key expansion pipeline performs a step of a cipher algorithm (block 1308). For example, a portion of key expansion pipeline 430 may be configured to perform a step of the AES algorithm during cipher execution, such as the SubBytes step as described above.

In the embodiment of SPU 240 illustrated in FIG. 11, I/O interface 650 may be configured to coordinate the transfer of data between SPU 240 and crossbar interface 260. For example, in some embodiments, state storage 410 may be configured to receive a data block to be encrypted or decrypted via I/O interface 650. Similarly, in some embodiments key storage 610 may be configured to receive via I/O interface 650 an initial cipher key from which key expansion pipeline 630 may generate an expanded key set as described above. In some embodiments, SPU 240 may include additional units configured to implement other encryption algorithms, hash algorithms, or other suitable functions. In such embodiments, I/O interface 650 may be configured to coordinate data transfer on behalf of such additional units as well as the illustrated encryption hardware.

In various embodiments, I/O interface 650 may include any suitable logic or data structures configured to perform data transfers to and/or from SPU 240. For example, in one embodiment I/O interface 650 may include arbitration logic configured to resolve conflicts when multiple units concurrently request I/O access. In some embodiments, I/O interface 650 may include queuing or buffering data structures configured to temporarily store data being sent or received. I/O interface 650 may in various embodiments further include logic to check data for errors (e.g., parity checking), perform clock rate conversion between receiving and transmitting clock domains, or perform conversion between data transfer protocols or formats (e.g., serial to parallel data conversion or vice versa, conversion between logical interface or signaling protocols).

I/O operations may be initiated across I/O interface 650 using any suitable mechanism. For example, in one embodiment, I/O interface 650 may be mapped as one or more control registers accessible by an instruction issued by, for example, IFU 200. In such an embodiment, software may indirectly access SPU 240, for example to convey the initial cipher key to key storage 610, by issuing an appropriate instruction to read and/or write the appropriate control register(s). In another embodiment, I/O interface 650 may be mapped to a portion of memory address space, such that load and store instructions to that portion of address space may be used to initiate I/O operations across I/O interface 650. In still another embodiment, programmer-visible instructions specific to the transfer of data to and from SPU 240 may be added to the instruction set architecture (ISA) implemented by core 100.

In some embodiments of SPU 240, implementation constraints may limit the data transfer bandwidth available via I/O interface 650. For example, to limit the interconnect resources required, I/O interface 650 may provide a 64-bit-per-cycle data transfer bandwidth. Further, if SPU 240 includes other units that perform I/O, the available bandwidth may be shared among these units, further limiting the bandwidth available to a given unit at a given time.

It may be possible, in some embodiments, to generate an expanded key set externally to SPU 240 and to transfer the expanded keys to key storage 610 via I/O interface 650. For example, a separate software routine may be configured to execute the key expansion algorithm under the control of an operating system, and the resulting expanded keys may be transferred through I/O interface 650 through a suitable mechanism, such as a control register interface, memory-mapped I/O, custom data transfer instructions, etc. as mentioned above. However, performing key expansion externally to SPU 240 may result in a set of expanded keys that, for AES, may be approximately 7.5 to 11 times larger than the initial cipher key. Further, in instances where the message to be encrypted/decrypted is small (such as a single 128-bit data block, which may be a common case in Web-based secure transactions) the expanded key set may be substantially larger than the message itself.

In some embodiments, the rate of key generation achieved by key expansion pipeline 630 may be higher than the rate at which the set of expanded keys may be transferred across I/O interface 650. For example, key expansion pipeline 630 may be configured to operate at a higher bandwidth (e.g., a higher clock rate and/or a wider datapath) than I/O interface 650. Consequently, the performance of key expansion performed locally to other cipher hardware within SPU 240 may be improved relative to computing key expansion externally and transferring the expanded set over a slower and possibly congested interface. In addition to potentially improving the performance of key expansion, providing key expansion locally to SPU 240 may have the effect of compressing the relative amount of data required to be provided across I/O interface 650, since only the initial cipher key may be transferred across I/O interface 650 in this case. Since I/O interface 650 may be shared by other, possibly entirely separate units, such compression may improve the performance of the sharing units, for example by increasing bandwidth available to those units for data transfer.

Figure 14:
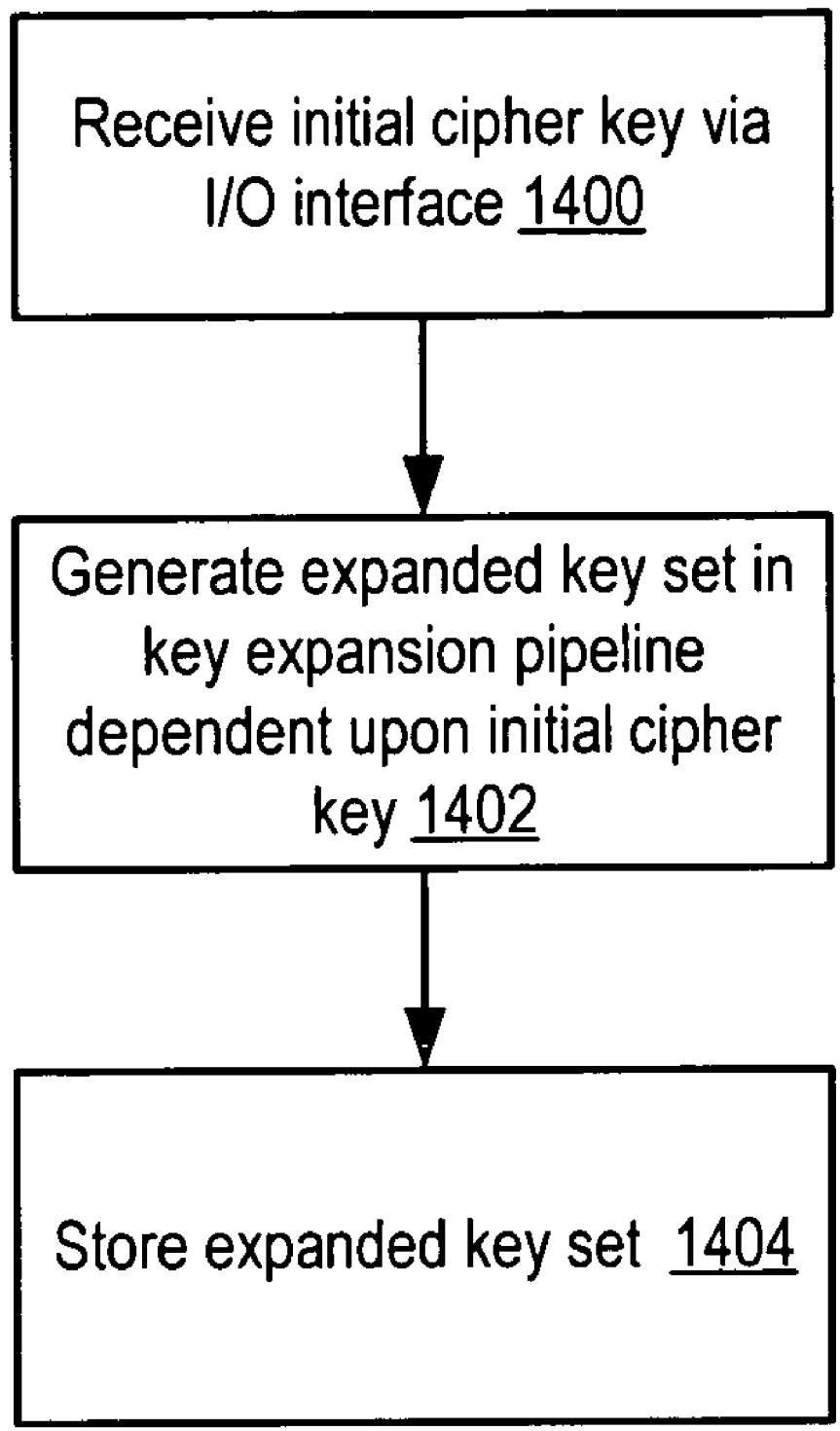
FIG. 14 is a flow diagram illustrating one embodiment of a method of performing cipher key expansion internally to a cryptographic unit.

One embodiment of a method of performing key expansion internally to a cryptographic unit is illustrated in FIG. 14. Referring collectively to FIGS. 1-14, operation begins in block 1400 where an initial cipher key for a cipher algorithm is received via an I/O interface. For example, in one embodiment the initial cipher key may be received by SPU 240 via I/O interface 650.

Subsequently, an expanded set of cipher keys is generated in a key expansion pipeline dependent upon the initial cipher key (block 1402). In one embodiment, key expansion pipeline 630 may include a plurality of pipeline stages, where each pipeline stage is configured to perform a corresponding step of generating a member of the expanded set of cipher keys as described above. The expanded set of cipher keys is stored, for example within key storage 610 (block 1404).

Exemplary System Embodiment

Figure 15:
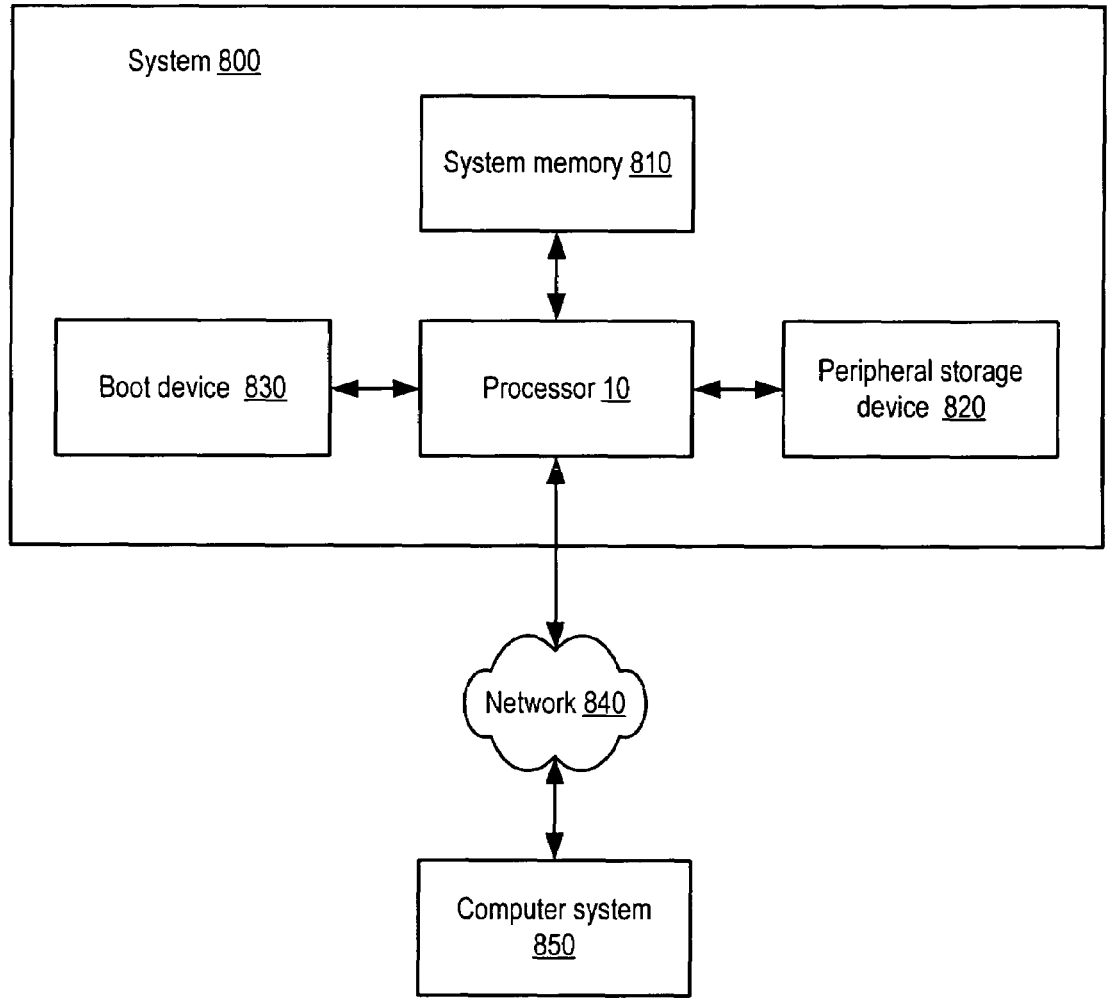
FIG. 15 is a block diagram illustrating one embodiment of a system including a multithreaded processor.

As described above, in some embodiments SPU 240 may be included within a processor core 100 as illustrated in FIG. 2. In turn, one or more processor cores 100 may be included within a processor 10 as illustrated in FIG. 1. In some embodiments, processor 10 may be configured to interface with a number of external devices. One embodiment of a system including processor 10 is illustrated in FIG. 15. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cryptographic unit configured to implement a block cipher algorithm, said cryptographic unit comprising:
   state storage configured to store cipher state, wherein said cipher state includes a plurality of rows and a plurality of columns; and
   a cipher pipeline comprising a plurality of pipeline stages, wherein each pipeline stage is configured to perform a corresponding step of said block cipher algorithm on said cipher state, wherein a given one of said pipeline stages is configured such that a maximum number of columns that said given pipeline stage is operable to concurrently process is fewer than all of said columns of said cipher state, and wherein during execution of a given round of said block cipher algorithm, said given pipeline stage is operable to process said cipher state in portions over multiple distinct cycles of operation.

2. The cryptographic unit as recited in claim 1, wherein an implementation area of said given pipeline stage is proportional to a number of said columns said given pipeline stage is configured to concurrently process.

3. The cryptographic unit as recited in claim 1, wherein said block cipher algorithm is compliant with a version of Advanced Encryption Standard.

4. The cryptographic unit as recited in claim 1, wherein said block cipher algorithm comprises a byte-substitution step and a row-shifting step, and wherein during an encryption operation, said row-shifting step is performed prior to said byte-substitution step.

5. The cryptographic unit as recited in claim 1, wherein said block cipher algorithm comprises a byte-substitution step, a column-mixing step and an add-round-key step, wherein a first one of said plurality of pipeline stages is configured to implement said byte-substitution step, and wherein a second one of said plurality of pipeline stages is configured to implement said column-mixing step and said add-round-key step.

6. The cryptographic unit as recited in claim 1, wherein each of said plurality of pipeline stages is configured to concurrently process two columns of said cipher state.

7. The cryptographic unit as recited in claim 1, wherein each of said plurality of pipeline stages is configured to concurrently process one column of said cipher state.

8. A processor, comprising:
the cryptographic unit as recited in claim 1; and
instruction fetch logic configured to issue a first instruction from one of a plurality of threads during one execution cycle and to issue a second instruction from another one of said plurality of threads during a successive execution cycle;
wherein said cryptographic unit is configured to execute independently of said instruction fetch logic.

9. A processor, comprising:
the cryptographic unit as recited in claim 1; and
instruction fetch logic configured to issue a plurality of instructions including a first and a second instruction, wherein said first instruction is issued from one of a plurality of threads during one execution cycle, and wherein said second instruction is issued from another one of said plurality of threads during a successive execution cycle;
wherein said cryptographic unit is configured to execute one of said plurality of instructions issued by said instruction fetch logic.

10. A method, comprising:
storing cipher state of a block cipher algorithm, wherein said cipher state includes a plurality of rows and a plurality of columns; and
executing said block cipher algorithm in a plurality of pipeline stages, wherein each pipeline stage is configured to perform a corresponding step of said block cipher algorithm on said cipher state;
wherein executing said block cipher algorithm comprises a given one of said pipeline stages concurrently processing a maximum number of columns of said cipher state that is fewer than all of said columns of said cipher state; and
wherein executing said block cipher algorithm further comprises, for a given round of said block cipher algorithm, said given pipeline stage processing said cipher state in portions over multiple distinct cycles of operation.

11. The method as recited in claim 10, wherein an implementation area of said given pipeline stage is proportional to a number of said columns said given pipeline stage is configured to concurrently process.

12. The method as recited in claim 10, wherein said block cipher algorithm is compliant with a version of Advanced Encryption Standard.

13. The method as recited in claim 10, wherein said block cipher algorithm comprises a byte-substitution step and a row-shifting step, and wherein during an encryption operation, said row-shifting step is performed prior to said byte-substitution step.

14. The method as recited in claim 10, wherein said block cipher algorithm comprises a byte-substitution step, a column-mixing step and an add-round-key step, wherein a first one of said plurality of pipeline stages is configured to implement said byte-substitution step, and wherein a second one of said plurality of pipeline stages is configured to implement said column-mixing step and said add-round-key step.

15. The method as recited in claim 10, wherein each of said plurality of pipeline stages is configured to concurrently process two columns of said cipher state.

16. The method as recited in claim 10, wherein each of said plurality of pipeline stages is configured to concurrently process one column of said cipher state.

17. The method as recited in claim 10, further comprising:
issuing a first instruction from one of a plurality of threads during one execution cycle; and
issuing a second instruction from another one of said plurality of threads during a successive execution cycle;
wherein executing said block cipher algorithm is configured to operate independently of issuing instructions from said plurality of threads.

18. The method as recited in claim 10, further comprising:
issuing a plurality of instructions including a first and a second instruction, wherein said first instruction is issued from one of a plurality of threads during one execution cycle, and wherein said second instruction is issued from another one of said plurality of threads during a successive execution cycle;
wherein executing said block cipher algorithm occurs in response to issuing one of said plurality of instructions.

19. A system, comprising:
a system memory; and
a processor coupled to said system memory and comprising a cryptographic unit configured to implement a block cipher algorithm, said cryptographic unit comprising:
state storage configured to store cipher state, wherein said cipher state includes a plurality of rows and a plurality of columns; and
a cipher pipeline comprising a plurality of pipeline stages, wherein each pipeline stage is configured to perform a corresponding step of said block cipher algorithm on said cipher state, wherein a given one of said pipeline stages is configured such that a maximum number of columns that said given pipeline stage is operable to concurrently process is fewer than all of said columns of said cipher state, and wherein during execution of a given round of said block cipher algorithm, said given pipeline stage is operable to process said cipher state in portions over multiple distinct cycles of operation.

20. The system as recited in claim 19, wherein an implementation area of said given pipeline stage is proportional to a number of said columns said given pipeline stage is configured to concurrently process.

21. The system as recited in claim 19, wherein said block cipher algorithm is compliant with a version of Advanced Encryption Standard.

22. The system as recited in claim 19, wherein said block cipher algorithm comprises a byte-substitution step and a row-shifting step, and wherein during an encryption operation, said row-shifting step is performed prior to said byte-substitution step.

23. The system as recited in claim 19, wherein said block cipher algorithm comprises a byte-substitution step, a column-mixing step and an add-round-key step, wherein a first one of said plurality of pipeline stages is configured to implement said byte-substitution step, and wherein a second one of said plurality of pipeline stages is configured to implement said column-mixing step and said add-round-key step.

24. The system as recited in claim 19, wherein each of said plurality of pipeline stages is configured to concurrently process two columns of said cipher state.

25. The system as recited in claim 19, wherein each of said plurality of pipeline stages is configured to concurrently process one column of said cipher state.

26. The system as recited in claim 19, wherein said processor further comprises instruction fetch logic configured to issue a first instruction from one of a plurality of threads during one execution cycle and to issue a second instruction from another one of said plurality of threads during a successive execution cycle, and wherein said cryptographic unit is configured to execute independently of said instruction fetch logic.

27. The system as recited in claim 19, wherein said processor further comprises instruction fetch logic configured to issue a plurality of instructions including a first and a second instruction, wherein said first instruction is issued from one of a plurality of threads during one execution cycle, and wherein said second instruction is issued from another one of said plurality of threads during a successive execution cycle, and wherein said cryptographic unit is configured to execute one of said plurality of instructions issued by said instruction fetch logic.

* * * * *

UNITED STATES PATENT AND TRADEMARK OFFICE
CERTIFICATE OF CORRECTION

PATENT NO.       : 7,570,760 B1
APPLICATION NO.  : 10/939829
DATED            : August 4, 2009
INVENTOR(S)      : Olson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1360 days.

Signed and Sealed this

Seventh Day of September, 2010

David J. Kappos
*Director of the United States Patent and Trademark Office*